United States Patent
Nawaz et al.

(10) Patent No.: US 10,807,085 B2
(45) Date of Patent: Oct. 20, 2020

(54) SILVER RECOVERY AS $Ag^0$ NANOPARTICLES FROM ION-EXCHANGE REGENERANT SOLUTION

(71) Applicant: University of Massachusetts, Boston, MA (US)

(72) Inventors: Tabish Nawaz, Beaumont, TX (US); Sukalyan Sengupta, North Dartmouth, MA (US); Chen-Lu Yang, Westport, MA (US)

(73) Assignee: University of Massachusetts, Boston, MA (US)

( * ) Notice: Subject to any disclaimer, the term of this patent is extended or adjusted under 35 U.S.C. 154(b) by 155 days.

(21) Appl. No.: 16/193,034

(22) Filed: Nov. 16, 2018

(65) Prior Publication Data

US 2019/0151838 A1    May 23, 2019

Related U.S. Application Data (60) Provisional application No. 62/587,730, filed on Nov. 17, 2017, provisional application No. 62/647,651, filed on Mar. 24, 2018.

(51) Int. Cl.
*B01J 49/06* (2017.01)
*B01J 49/53* (2017.01)
(Continued)

(52) U.S. Cl.
CPC .............. *B01J 49/06* (2017.01); *B01J 39/04* (2013.01); *B01J 39/20* (2013.01); *B01J 49/53* (2017.01);
(Continued)

(58) Field of Classification Search
CPC ..... B22F 2301/255; B22F 1/0018; C02F 1/66; C02F 1/5272; C02F 1/42; C02F 1/461;
(Continued)

(56) References Cited

U.S. PATENT DOCUMENTS

| 3,647,452 | A | * | 3/1972 | Hendess | .................. | G03C 7/30 |
| | | | | | | 430/379 |
| 5,795,452 | A | * | 8/1998 | Kinoshita | ........... | C23C 16/5096 |
| | | | | | | 204/298.37 |

(Continued)

FOREIGN PATENT DOCUMENTS

| CN | 207760158 | 8/2018 |
| EP | 0430323 | 6/1991 |

OTHER PUBLICATIONS

Absalan, G., & Mehrdjardi, M. A., 2003. Separation and preconcentration of silver ion using 2-mercaptobenzothiazole immobilized on surfactant-coated alumina. Sep. Purif. Technol., 33(1), pp. 95-101.

(Continued)

*Primary Examiner* — Ana M Fortuna
(74) *Attorney, Agent, or Firm* — Renner, Otto, Boisselle & Sklar, LLP (57) ABSTRACT

Silver is recovered as $Ag^0$ nanoparticles from the spent solution obtained from the regeneration of an Ag-loaded ion exchange resin using electrolysis. The reclaimed regenerant solution is recycled and reused in a closed-loop scheme over multiple cycles. The recovered $Ag^0$ nanoparticles are monodisperse, spherical in shape, and have a mean diameter of about 6 nm.

18 Claims, 8 Drawing Sheets

(51) Int. Cl.
| | |
|---|---|
| *B01J 49/60* | (2017.01) |
| *B01J 39/04* | (2017.01) |
| *C02F 1/42* | (2006.01) |
| *B01J 39/20* | (2006.01) |
| *C02F 101/20* | (2006.01) |
| *C02F 103/00* | (2006.01) |
| *C02F 1/66* | (2006.01) |
| *C02F 1/461* | (2006.01) |
| *C02F 1/52* | (2006.01) |

(52) U.S. Cl.
CPC ............... *B01J 49/60* (2017.01); *C02F 1/42* (2013.01); *C02F 1/461* (2013.01); *C02F 1/66* (2013.01); *C02F 2001/425* (2013.01); *C02F 2001/5218* (2013.01); *C02F 2101/20* (2013.01); *C02F 2103/002* (2013.01); *C02F 2303/16* (2013.01)

(58) Field of Classification Search
CPC ........ C02F 2001/425; C02F 2001/5218; C02F 2103/002; C02F 2303/16; G03C 5/3954; G03C 2007/3025; Y10S 430/164; B01D 2311/04; B01D 61/44; B01D 15/00; C01G 37/14; C01G 5/003; B01J 39/04; B01J 49/06; B01J 49/60; C22B 11/04
See application file for complete search history.

(56) References Cited

U.S. PATENT DOCUMENTS

| | | | | |
|---|---|---|---|---|
| 9,347,114 | B1* | 5/2016 | Atta | B22F 9/24 |
| 9,637,806 | B2* | 5/2017 | Johnson | B82Y 30/00 |
| 2009/0078649 | A1* | 3/2009 | Mihaylov | C02F 1/42 |
| | | | | 210/635 |
| 2014/0076735 | A1* | 3/2014 | Lapidus Lavine | C25C 1/22 |
| | | | | 205/569 |
| 2014/0311896 | A1* | 10/2014 | Lapidus Lavine | C25C 7/00 |
| | | | | 204/252 |
| 2018/0015442 | A1* | 1/2018 | Nell | C07C 323/29 |
| 2019/0151838 | A1* | 5/2019 | Nawaz | B01J 39/04 |

OTHER PUBLICATIONS

Ahamed, M., Alsalhi, M. S., & Siddiqui, M. K. J., 2010. Silver nanoparticle applications and human health. Clin. chim. acta, 411(23), pp. 1841-1848.
Baláž, P., Ficeriová, J., & Leon, C. V., 2003. Silver leaching from a mechanochemically pretreated complex sulfide concentrate. Hydrometallurgy, 70(1), pp. 113-119.
Benn, T. M., & Westerhoff, P., 2008. Nanoparticle silver released into water from commercially available sock fabrics. Environ. Sci. Technol, 42(11), pp. 4133-4139.
Brownson, D. A. C., & Banks, C. E., 2014. Interpreting electrochemistry, in: Brownson, D. A. C., & Banks, The Handbook of Graphene Electrochemistry. Springer—Verlag London, pp. 23-77.
Caswell, K. K., Bender, C. M., & Murphy, C. J., 2003. Seedless, surfactantless wet chemical synthesis of silver nanowires. Nano Letters, 3(5), pp. 667-669.
Díaz, M. E. P., Alonso, A. R., González, I., & Lapidus, G. T. (2012). Influence of oxygen reduction and hydrogen evolution in the gold and silver direct electrodeposition process from thiourea solutions in a filter press type reactor. Hydrometallurgy, 129, pp. 90-96.
Gagné, F., André, C., Skirrow, R., Gélinas, M., Auclair, J., Van Aggelen, G., & Gagnon, C., 2012. Toxicity of silver nanoparticles to rainbow trout: a toxicogenomic approach. Chemosphere, 89(5), pp. 615-622.
Geranio, L., Heuberger, M., & Nowack, B., 2009. The behavior of silver nanotextiles during washing. Environ. Sci. Technol., 43(21), pp. 8113-8118.

GFMS World Silver Survey 2017—The Silver Institute (accessed Nov. 17, 2017) www.silverinstitute.org/site/WSS2017.pdf.
Gherrou, A., Kerdjoudj, H., Molinari, R., & Drioli, E., 2001. Modelization of the transport of silver and copper in acidic thiourea medium through a supported liquid membrane. Desalination, 139(1-3), pp. 317-325.
Gurung, M., Adhikari, B. B., Kawakita, H., Ohio, K., Inoue, K., & Alam, S., 2013. Recovery of gold and silver from spent mobile phones by means of acidothiourea leaching followed by adsorption using biosorbent prepared from persimmon tannin. Hydrometallurgy, 133, pp. 84-93.
Lorenz, C., Windler, L., Von Goetz, N., Lehmann, R. P., Schuppler, M., Hungerbühler, K., & Nowack, B., 2012. Characterization of silver release from commercially available functional (nano) textiles. Chemosphere, 89(7), pp. 817-824.
Ma, H., Yin, B., Wang, S., Jiao, Y., Pan, W., Huang, S., & Meng, F., 2004. Synthesis of silver and gold nanoparticles by a novel electrochemical method. ChemPhysChem, 5(1), pp. 68-75.
Mitrano, D. M., Arroyo Rojas Dasilva, Y., & Nowack, B., 2015. Effect of variations of washing solution chemistry on nanomaterial physicochemical changes in the laundry cycle. Environ. Sci. & Technol., 49(16), pp. 9665-9673.
Moores, A., & Goettmann, F., 2006. The plasmon band in noble metal nanoparticles: an introduction to theory and applications. New Journal of Chemistry, 30(8), pp. 1121-1132.
Morley, N., & Eatherley, D., 2008. Material Security: Ensuring resource availability for the UK economy. C-Tech Innovation Limited.
Murray, B. J., Li, Q., Newberg, J. T., Menke, E. J., Hemminger, J. C., & Penner, R. M., 2005. Shape-and size-selective electrochemical synthesis of dispersed silver (I) oxide colloids. Nano letters, 5(11), pp. 2319-2324.
Nawaz, T., & Sengupta, S., 2017. Silver recovery from greywater: Role of competing cations and regeneration. Sep. Purif. Technol., 176, pp. 145-158.
Nawaz, T., & Sengupta, S., 2017. Silver recovery from laundry washwater: the role of detergent chemistry. ACS Sustain. Chem. Eng. (Just accepted manuscript). DOI: 10.1021/acssuschemeng. 7b02933.
Pillai, Z. S., & Kamat, P. V., 2004. What factors control the size and shape of silver nanoparticles in the citrate ion reduction method? J. Phys. Chem. B, 108(3), pp. 945-951.
Poisot-Díaz, M. E., González, I., & Lapidus, G. T., 2008. Electrodeposition of a silver-gold alloy (DORE) from thiourea solutions in the presence of other metallic ion impurities. Hydrometallurgy, 93(1), pp. 23-29.
Reents, B., Plieth, W., Macagno, V. A., & Lacconi, G. I., 1998. Influence of thiourea on silver deposition: Spectroscopic investigation. Journal of Electroanalytical Chemistry, 453(1), pp. 121-127.
Rodriguez-Sanchez, L., Blanco, M. C., & Lopez-Quintela, M. A., 2000. Electrochemical synthesis of silver nanoparticles. The Journal of Physical Chemistry B, 104(41), pp. 9683-9688.
Stamplecoskie, K. G., & Scaiano, J. C., 2010. Light emitting diode irradiation can control the morphology and optical properties of silver nanoparticles. J. Am. Chem. Soc, 132(6), pp. 1825-1827.
Tan, J. M., Qiu, G., & Ting, Y. P., 2015. Osmotic membrane bioreactor for municipal wastewater treatment and the effects of silver nanoparticles on system performance. J Clean Prod, 88, pp. 146-151.
Teutli, M., Lapidus, G., & González, I., 1990. The kinetics of silver cementation from thiourea solutions using aluminum. Advances in Gold and Silver Processing, pp. 249-256.
Turkevich, J., Stevenson, P. C., & Hillier, J., 1951. A study of the nucleation and growth processes in the synthesis of colloidal gold. Discussions of the Faraday Society, 11, pp. 55-75.
Vance, M. E., Kuiken, T., Vejerano, E. P., McGinnis, S. P., Hochella Jr, M. F., Rejeski, D., & Hull, M. S., 2015. Nanotechnology in the real world: Redeveloping the nanomaterial consumer products inventory. Beilstein J Nanotechnol, 6, 1769.
Varentsov, V. K., & Varentsova, V. I., 2004. Electrolysis with carbon-graphite flow electrodes for solving problems of precious metal extraction from jewellery manufacturing wastes, Chem. Sust. Develop, 12, 293.

(56) References Cited

OTHER PUBLICATIONS

Westerhoff, P., Lee, S., Yang, Y., Gordon, G. W., Hristovski, K., Halden, R. U., & Herckes, P., 2015. Characterization, recovery opportunities, and valuation of metals in municipal sludges from US wastewater treatment plants nationwide. Environ. Sci. & Technol., 49(16), pp. 9479-9488.

Yan, M., Liu, K., & Jiang, Z., 1996. Electrochemical oxidation of thiourea studied by use of in situ FTIR spectroscopy. Journal of Electroanalytical Chemistry, 408(1-2), pp. 225-229.

Yeo, M. K., & Yoon, J. W., 2009. Comparison of the effects of nano-silver antibacterial coatings and silver ions on zebrafish embryogenesis. Molecular and Cellular Toxicology, 5(1), pp. 23-31.

Yin, B., MA, H., Wang, S., & Chen, S., 2003. Electrochemical synthesis of silver nanoparticles under protection of poly (N-vinylpyrrolidone). J. Phys. Chem. B, 107(34), pp. 8898-8904.

Zhu J., Liu, S., Palchik, O., Koltypin, Y., & Gedanken, A., 2000. Shape-controlled synthesis of silver nanoparticles by pulse sonoelectrochemical methods. Langmuir, 16(16), pp. 6396-6399.

Chamsaz, M., Riazi, M.M., Separation of Silver by Ion-Exchange Resin and its Determination by Electrothermal Atomic Absorption Spectometry. Asian Journal of Chemistry, vol. 24, No. 3 (2012), 957-960.

Waitz, Jr., W. H. Ion Exchange for Recovery of Precious Metals. Plating and Surface Finishing, pp. 56-59.

\* cited by examiner

SILVER RECOVERY AS AG⁰ NANOPARTICLES FROM ION-EXCHANGE REGENERANT SOLUTION

This application claims the benefit of the filing date of U.S. Provisional Patent Application No. 62/587,730 filed Nov. 17, 2017, and of U.S. Provisional Patent Application No. 62/647,651 filed Mar. 24, 2018, both of which are incorporated in their entireties herein by reference.

TECHNICAL FIELD

The present invention relates to a method of recovering silver from waste water, and more particularly, to recovering silver from ion exchange regenerant solution.

BACKGROUND

The use of silver (Ag) in consumer products, due to its anti-microbial properties, has steadily risen in the past decade. Several investigators have reported Ag-leaching from these consumer products, particularly from textiles during laundry wash. The leached Ag ending up in the environment via domestic waste streams can potentially pose serious ecotoxicological risks to aquatic organisms, bacterial treatment processes in wastewater treatment plants (WWTPs) and humans. Therefore, removal of Ag from domestic waste streams, particularly laundry waste water, is an environmental necessity. The Ag-recovery can additionally generate revenue and bring down the treatment cost, as Ag can potentially be the most profitable material to be recovered from WWTPs. Ag-recovery from laundry wash water can open an additional source of Ag in the supply chain. This would ease pressure on the present mining sources, which are reported to be declining in production, and prevent pollution (greenhouse gas emissions) caused due to the mining processes.

SUMMARY

Ag has been recovered as Ag⁰ nanoparticles from the spent solution (thiourea (TU) ~0.5 mol/L, pH ~1.1-1.2, and Ag ~550 mg/L) obtained from the regeneration of an Ag-loaded resin using a simple undivided electrolytic cell. The reclaimed regenerant solution has been recycled and reused in a closed-loop scheme over multiple cycles. The process parameters, i.e., current (0.05 A) and stirring speed (600 r/min), have been optimized for Ag recovery of ~94% and TU loss of ~2%. The reclaimed regenerant solution regenerates Ag-loaded resin samples with >90% regeneration efficiency over four cycles of consecutive extraction and regeneration. The recovered Ag⁰ nanoparticles are monodisperse, consistently spherical in shape, and have a mean diameter of ~6 nm with standard deviation of the Gaussian fit as ~2.66 nm.

In a first aspect of the invention, there is provided a method of recovering silver from silver-containing waste water solution that includes the steps of: (a) providing an ion exchange column containing an ion exchange resin; (b) introducing the silver-containing waste water solution to the ion exchange column to absorb silver in the ion exchange resin; (c) eluting the loaded ion exchange resin with an acidified thiourea regenerant solution to remove silver from the resin and to obtain a spent regenerant solution containing a thiourea-silver complex, $Ag(TU)_x^+$, where x=1-4; (d) electrolytically separating the silver from the $Ag(TU)_x^+$ complex of the spent regenerant solution by electrodepositing silver onto a substrate, and removing the silver depleted thiourea regenerant solution; (e) electrolytically recovering the silver as Ag⁰ from the silver deposited substrate by submerging the silver-deposited substrate and a graphite electrode in an electrolyte solution containing a stabilizing agent including citric acid in an electrolytic cell, and applying current to the electrolytic cell; and (f) reusing the silver depleted thiourea regenerant solution removed in step (d) in subsequent elution of loaded ion exchange resin.

In one embodiment, the ion exchange resin in a thiol functionalized ion exchange resin.

In one embodiment, the ion exchange resin is a macroporous polystyrenic acidic cation exchange resin containing thiol functional groups.

In one embodiment, the recovered Ag⁰ has about 100% purity.

In one embodiment, the amount of recovered silver is at least 90% by weight of the silver in the silver-containing waste water. In another embodiment, the amount of recovered silver is at least 94% by weight of the silver in the silver-containing waste water.

In one embodiment, the recovered Ag⁰ nanoparticles are substantially spherical in shape and have an average diameter of 3.4 nm to 8.7 nm.

In one embodiment, the pH of the acidified thiourea regenerant solution is in the range of 1.0 to 1.3.

In one embodiment, the electrolytic separation step (d) does not include the addition of external chemicals to the electrolyte solution.

In one embodiment, the stabilizing agent further includes sodium docedyl benzene sulfonate.

In one embodiment, the pH of the electrolyte solution in step (e) is about 6.

In one embodiment, the thiourea content of the silver-depleted thiourea regenerant solution of step (f) is at least 95% of the thiourea content of the regenerant solution of step (c).

In one embodiment, the substrate onto which the silver is deposited is a titanium plate.

In another aspect of the invention there is provided a method of recovering silver from greywater that includes the steps of: (a) providing an ion exchange column containing an ion exchange resin; (b) introducing the silver-containing greywater to the ion exchange column to absorb silver in the ion exchange resin, wherein the greywater contains at least one detergent composition; (c) eluting the loaded ion exchange resin with an acidified thiourea regenerant solution to remove silver from the resin and to obtain a spent regenerant solution containing a thiourea-silver complex, $Ag(TU)_x^+$, where x=1-4; (d) precipitating silver from the thiourea composition by adjusting the pH of the spent regenerant solution to recover the silver, wherein the silver is recovered as $Ag_2S$ nanoparticles and/or high purity powder; and (e) obtaining silver depleted thiourea regenerant solution.

In one embodiment, the ion exchange resin is a thiol functionalized ion exchange resin.

In one embodiment, the at least one detergent comprises one or more component selected from sodium dodecylbenzene sulfonate (SDBS), sodium dodecyl sulfate (SDS), Berol 266 alcohol ethoxylate non-ionic surfactant, diethylenetriamine pentaacetate (DTPA), zeolite, sodium metasilicate pentahydrate, sodium carbonate, 4,4'-diamino-2,2'-stilbenedisulfonic acid, sodium perborate, tetraacetyleneethylenediamine (TAED), and combinations of two or more thereof.

In one embodiment, adjusting the pH of the spent regenerant solution includes increasing the pH to about 11-12 by adding NaOH solution.

In one embodiment, the method further includes readjusting the pH of the silver depleted regenerant solution to about 1.5, and reusing the silver depleted regenerant solution in subsequent elution of loaded ion exchange resin.

BRIEF DESCRIPTION OF THE DRAWINGS

FIGS. 10A and 10B are TEM images of the $Ag^0$ nanoparticles recovered in the study (citric acid concentration: 5 g/l, electrolysis time: 1 hour, current: 0.05 A, stirring speed: 60 r/min, pH: ~6).

FIG. 10C is a photograph of the yellow colored solution of $Ag^0$ nanoparticles.

FIG. 10D is a size distribution histogram of $Ag^0$ nanoparticles with Gaussian fit.

DETAILED DESCRIPTION

Ag recovery from laundry wash water leads to sustainability, fulfilling its environmental (removal of a toxic contaminant), economic (revenue generation) and social (source-separated laundry wash water treatment) objectives.

Since Ag is in low concentration in the laundry wash solution, whereas other components (cations: $Na^+$, $Mg^{2+}$, $Ca^{2+}$; surfactants, builders and formulating agents) are at least an order of magnitude higher in concentration, the recovery scheme therefore must be Ag selective. The use of ion-exchangers with Ag-selective functional group, such as thiol, provides an approach to this problem.

In a first aspect of the invention, Ag was selectively removed from greywater and laundry wash water using a thiol-functionalized ion-exchange resin in a packed-bed column. The laundry wash water may contain one or more detergent components, such as sodium dodecylbenzene sulfonate (SDBS), sodium dodecyl sulfate (SDS), Berol 266 alcohol ethoxylate non-ionic surfactant, diethylenetriamine pentaacetate (DTPA), zeolite, sodium metasilicate pentahydrate, sodium carbonate, 4,4'-diamino-2,2'-stilbenedisulfonic acid, sodium perborate, tetraacetyleneethylenediamine (TAED), and combinations of two or more thereof.

The resin column was regenerated using acidified thiourea (TU) solution. Ag was recovered as $Ag_2S$ (both as nanoparticles and macro-sized powder) from the spent regenerant solution (containing Ag as $Ag(TU)_x^+$ (x=1-4) by alkaline hydrolysis and the regenerant solution was recycled and reused over multiple cycles. However, $Ag^0$ nanoparticles are much more desirable than $Ag_2S$ for their economic value. Moreover, alkaline hydrolysis involves drastic pH adjustment, from pH about 1.1 to pH of about 10-12 or 10-11, and then back to pH ~1.

This also leads to build-up of competing cations (e.g., $Na^+$ from the addition of NaOH solution) in the spent regenerant solution, compromising (i) the regeneration efficiency of the regenerant over multiple reuse cycles and (ii) its safe disposal due to increasing salinity.

In a second aspect of the invention, Ag is recovered from the spent regenerant solution ($Ag(TU)_x^+$ complex solution) as $Ag^0$ nanoparticles suitable for applications like textiles, cosmetics, etc. with minimum loss of TU, and without adding any additional chemical in the spent regenerant solution, which is important from recycle and reuse considerations. The present disclosure provides a method (1) to recover Ag as $Ag^0$ nanoparticles from the spent regenerant solution containing acidified TU and $Ag(TU)_x^+$, (2) to recover the spent regenerant solution with minimum TU and $H^+$ loss, and (3) to recycle and reuse the regenerant solution in multiple cycles of regeneration.

Several applications utilize TU for Ag extraction, such as desorption of Ag from ion-exchangers, leaching of Ag from mineral ores and printed circuit boards of mobile phones and as a carrier for Ag in supported liquid membranes, where Ag is recovered as $Ag(TU)_x^+$ complex. However, few of these applications focus on Ag recovery from the $Ag(TU)_x^+$ complex or the recycle and reuse of the final TU solution. Therefore, only a handful of methods exist, such as cementation and electrowinning. The cementation technique leads to accumulation of cations like $Al^{3+}$, $Zn^{2+}$, Cu2+, etc. in the spent solution, which would add to the contamination and may hamper the regeneration efficiency in subsequent cycles. Also, the cations must be purged before the solution can be recycled for further cycles. Since it is desirable to recycle and reuse the regenerant solution, methods that require addition of chemical species in the solution may compromise the purity of the regenerant and its effectiveness for regeneration. Electrowinning is advantageous as it is a direct recovery process and does not lead to addition of any external contaminants in the system.

Previously, Ag—Au alloy (dore) has been recovered using electrodeposition from pregnant leach liquor formed by TU leaching of mineral ores. The thermodynamics of the dore electrodeposition in the presence of $Zn^{2+}$, $Cu^{2+}$, $Pb^{2+}$ and $Fe^{2+}$ ions was studied. Ag—Au alloy was recovered using electrodeposition and the impact of hydrogen-evolution and oxygen-reduction side reactions on the process efficiency was analyzed. These previous works mostly explored the mechanism of Ag electrodeposition from $Ag(TU)_x^+$ complexes, and none specifically considered the process from sustainability and recovery perspectives, particularly recovering as $Ag^0$ nanoparticles and recycling and reuse of final TU solution. Furthermore, no previous work exists where Ag has been recovered as $Ag^0$ nanoparticles from $Ag(TU)_x^+$ complex solution.

In the present disclosure, an undivided electrolytic cell (in galvanostatic mode) was used to recover Ag (~94% recovery; 100% purity) as $Ag^0$ nanoparticles from the spent regenerant solution (containing TU, and $Ag(TU)_x^+$ at pH ~1.1-1.2) obtained from the elution of the packed-bed resin column. 98% of TU in the solution has been recovered with only a marginal change in its pH (from 1.2 to 1.4). The regenerant solution, after Ag recovery, has been recycled and reused for subsequent cycles of regeneration (four consecutive regeneration and extraction cycles). The process parameters, i.e., current and stirring speed (r/min), have been determined for optimal Ag recovery and minimal TU loss. The electrodeposited Ag on the cathode has been finally recovered as $Ag^0$ nanoparticles in aqueous solution with citric acid as the stabilizing agent.

Since TU regenerant solution must be reused after Ag recovery, the first step is to separate Ag and TU without introducing any external chemical species into the regenerant solution. Secondly, to recover Ag as $Ag^0$ nanoparticles, the use of a stabilizing agent is required. Therefore, the nanoparticles preparation must be carried out after Ag and TU are separated to avoid adding any stabilizing agent into the regenerant solution. The two-step process is necessary for the specified goals, where in step (1), Ag is separated from $Ag(TU)_x^+$ from the background of TU and H+, and in step (2), the extracted $Ag^0$ (on the cathode) is recovered as $Ag^0$ nanoparticles. The process schemes described herein and the results are useful for Ag recovery from various applications that utilize TU to concentrate Ag in solutions, such as leaching of mineral ores, printed circuit board of mobile phone waste and stripping of Ag-loaded ion-exchangers/adsorbents.

EXPERIMENTS

Materials and Methods:

High purity (ACS grade) citric acid (>99.5%), thiourea (>99%) and sodium hydroxide (1 mol/L NaOH) were obtained from Sigma Aldrich. Silver nitrate ($AgNO_3$) and nitric acid ($HNO_3$) (67-70% strength) were purchased from Alfa Aesar. The commercial resin Ambersep™ GT74 was obtained from Supelco Analytical (Bellefonte, Pa.). The spent regenerant solutions (TU concentration [TU]-0.5 mol/L Ag concentration [Ag] ~550 mg/L, $HNO_3$ concentration [$HNO_3$] ~0.1 mol/L (pH ~1.1-1.2)) obtained from regeneration of packed-bed resin column and batch runs from previous work were mixed together and subsequently used for all the experiments. The spent regenerant solution volume corresponded to 150 bed volumes (BVs) of the regenerant used for regenerating the packed-bed column that treated 14,000 BVs of the 5 mg/L Ag influent laundry wastewater solution. Additional spent regenerant solution was prepared by regenerating ~0.2 g of Ag-loaded resin samples with 100 mL of freshly prepared regenerant solution (0.5 mol/L TU+0.1 mol/L $HNO_3$ in deionized (DI) water) in batch mode; the resin mass (~0.2 g) was chosen as such to generate spent regenerant samples. The spent regenerant solution obtained after regenerating the packed bed-column (depending upon resin mass loading and saturation) is in the concentration range of 400-1000 mg/L. Therefore, the Ag-concentration range (~550-570 mg/L) used in the present disclosure for Ag-extraction using electrolysis can be considered typical for spent regenerant TU solution obtained after regenerating packed-bed resin columns. The additional spent regenerant solution prepared in this study was in the range of ~560-570 mg/L Ag concentration with ~0.5 mol/L TU at pH ~1.1-1.2. The batch process of preparing Ag-loaded resin and subsequent regeneration are described in detail below.

Ag-Electrodeposition Experiments:

All the experiments were conducted at room temperature (20±2° C.). The spent regenerant solution (100 mL) was magnetically stirred in an undivided electrolytic cell (5×5×5 cm) using a titanium plate (4×3 cm) as the cathode and a zirconium plate (4×3 cm) as the anode. The electrolysis was carried out galvanostatically using a direct current (DC) power supply (Tenma 72-6610, Tenma, USA) at different current (0.03, 0.05, 0.1, 0.2 and 0.3 A) and stirring speed (60, 300, 600 and 900 r/m in) values. After an hour of electrolytic cell operation, the cathode plate containing brown electrodeposit of Ag was changed, and the solution was filtered under vacuum filtration using 0.2 μm Whatman filter paper and analyzed for Ag and TU. The percentages of Ag-recovery ($P_{Ag}$) and TU remaining ($P_{TU}$) and current efficiency (CE) at the end of each hour were calculated as:

$$P_{Ag} = \frac{C_{Ag(t=0)} - C_{Ag(t)}}{C_{Ag(t=0)}} \times 100\% \quad (1)$$

$$M = (C_{Ag(t-1)} - C_{Ag(t)}) \times V \quad (2)$$

$$P_{TU} = \frac{C_{TU(t)}}{C_{TU(t=0)}} \times 100\% \quad (3)$$

$$CE = \frac{z \times F \times V \times (C_{Ag(t-1)} - C_{Ag(t)})}{I \times A \times 3600} \times 100\% \quad (4)$$

where, $C_{Ag(t=0)}$ (mg/L) is the concentration of Ag at time t=0, $C_{Ag(t)}$ (mg/L) is the concentration of Ag at time t (hr), $C_{Ag(t-1)}$ (mg/L) is the concentration of Ag at time (t−1) (hr), M (mg) is the mass of Ag electrodeposit, $C_{TU(t=0)}$ (mol/L) is the concentration of TU at t=0, $C_{TU(t)}$ (mol/L) is the concentration of TU at time t, z (1 for Ag) is valency, F is the Faraday's constant, V (0.1 L) is the volume of the solution, I (A) is the current reading, and A (108) is the atomic mass for Ag.

Based on $P_{Ag}$ and $P_{TU}$, 0.05 A current and 600 r/min stirring speed were chosen for the subsequent experiments with total time of electrolysis as 2 hours. A pH meter (AB15 Fisher Scientific) was used to monitor pH throughout the experiment. The final regenerant solution after Ag extraction was also analyzed for sulfate ions.

Final Ag Recovery from Electrode Posited Titanium Plate as Ag Nanoparticles:

To recover Ag from the Ag-electrodeposited titanium plate, the same electrolysis cell was used with 120 mL citric acid solution at pH ~6 as the electrolyte and the stabilizing agent for Ag nanoparticles. Three different citric acid concentrations (2, 5 and 10 g/L) were studied for their percentages of recovery of Ag as Ag-nanoparticles. The pH was adjusted to ~6 by adding 1 mol/L NaOH dropwise. The Ag-electrodeposit on the titanium plate was used as the sacrificial anode and a graphite rod (diameter 0.64 cm) was used as the cathode. Current (0.05 A) was passed using the same power source as used in the above step. The electrolysis was done for 60 minutes and the solution was continuously stirred at 60 r/min. After 60 minutes, the yellow-brown solution was filtered under vacuum filtration using 0.2 μm Whatman filter paper, and the filtrate was subsequently analyzed for Ag concentration, optical properties and particle size. Some black powder also formed in the solution and deposited on the graphite rod which was collected on the filter paper during filtration and by rinsing the graphite rod with DI water, respectively. The black powder was oven dried at 45±2° C. overnight and weighed and further analyzed for its identity. The percentages of Ag-recovery as Ag nanoparticles ($P_{Ag-nanoparticle}$) were calculated as follows:

$$P_{Ag-nanoparticle} = \frac{C_{Ag(filtrate)} \times V_{filtrate}}{M} \times 100\% \quad (5)$$

where, $C_{Ag(filtrate)}$ (mg/L) is the concentration of the filtrate and $V_{filtrate}$ (L) is the volume of the filtrate.

Recycle and Reuse Study of the Spent Regenerant Solution:

A fresh regenerant solution (100 mL) was prepared by mixing TU (0.5 mol/L) and HNO$_3$ (0.1 mol/L) in DI water. Batch tests were carried out to obtain Ag-loaded resin samples. Four sets of 1 L solution containing 100 mg/L Ag$^+$ (added as AgNO$_3$) was prepared in capped bottles. About 0.2 g of the resin was added to each bottle, subsequently they were tightly sealed and stirred for 24 hours in a rotary mixer. Initial and final samples (10 mL each) were withdrawn to calculate Ag-loading on the resin samples. The Ag-loading on the resin was calculated as:

$$\text{Ag-loading on resin} = (C_{Ag(t=0)} - C_{Ag(t=24\ hr)}) \times V \quad (6)$$

where, $C_{Ag(t=24\ hr)}$ (mg/L) is the concentration of Ag at 24 hours.

The Ag-loaded resin was then filtered and stirred in 100 mL of the fresh regenerant solution for 2 hours in the rotary mixer. After regeneration, the spent regenerant was filtered and analyzed for Ag. Subsequently, the spent regenerant was used for Ag-extraction as described above. Following this, the reclaimed regenerant solution was filtered and used for regenerating the next resin sample. This cycle was repeated four times. Percentage of regeneration (PR) was calculated after each regeneration cycle as follows:

$$PR = \frac{(C_{Ag\ after\ regeneration} - C_{Ag\ before\ regeneration}) \times V_R}{Ag-loading\ on\ the\ resin} \times 100\% \quad (7)$$

where, $V_R$ (mL) is the volume of the regenerant, and $C_{Ag\ before\ regeneration}$ (mg/L) and $C_{Ag\ after\ regeneration}$ (mg/L) are the regenerant Ag concentration before and after regeneration, respectively.

Analytical:

Ag was analyzed using a Perkin Elmer Atomic Absorption Spectrometer (AAS) (AAnalyst 300, Perkin Elmer) fitted with hollow Ag cathode lamp and absorption wavelength set at 328 nm and spectral slit of 0.7 nm with air-acetylene lamp. Five calibration points were used (blank, 1, 2, 5, and 10 mg/L of Ag prepared from silver nitrate standard (1000 mg/L Ag$^+$) (Perkin Elmer); linear calibration curve). TU was measured using an ultraviolet-visible (UV-Vis) spectrophotometer (DR6000, HACH) at a peak absorption wavelength of 236 nm. Sulfate analysis was done by Sulfa Ver 4 method 8051 HACH using powder pillows and UV-Vis spectrophotometer (DR6000, HACH). The Ag-deposited cathode after oven-drying was analyzed for elemental analysis and morphology using an energy dispersive X-ray (EDX) (INCA Energy EDX, Oxford Instruments, Inc.) in conjunction with a scanning electron microscope (SEM) (JSM 5610, JEOL, Inc.). The Ag$^0$ nanoparticle solution was analyzed for Ag concentration using AAS and for optical properties using UV-Vis spectrophotometer (DR6000, HACH) with respective citric acid solution (pH ~6) as background. About 2-3 μL of the Ag nanoparticle solution was put on the carbon-coated copper grid dropwise and dried under ambient condition before analyzing using transmission electron microscopy (TEM) (EM400 T, Philips) with a thermionic tungsten emitter running at 100 kV acceleration voltage in bright field mode. The particle size analysis from the SEM and TEM images were done using Imagej (an image processing software developed by the National Institute of Health, USA).

Figure 1A:
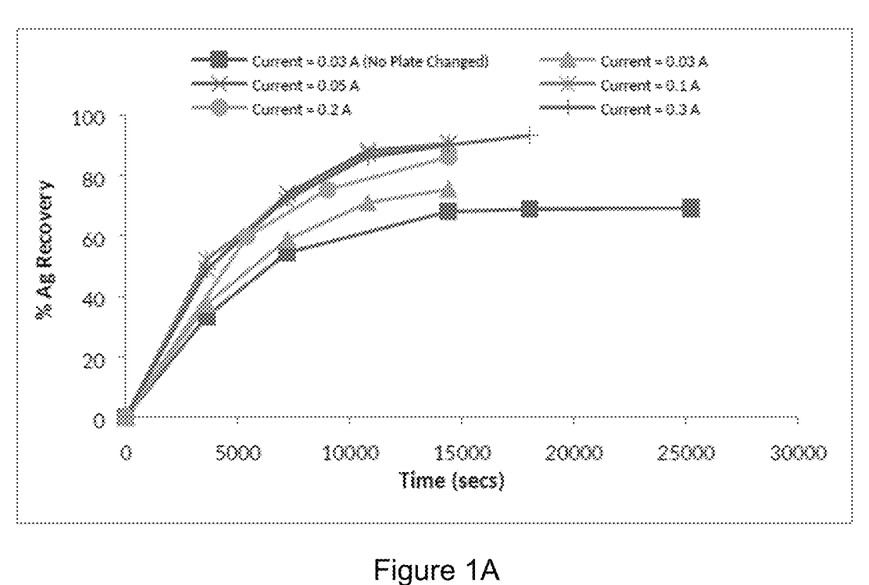
FIG. 1A is a graph showing the percentage of Ag recovery with electrolysis time at varying currents.
Figure 1B:
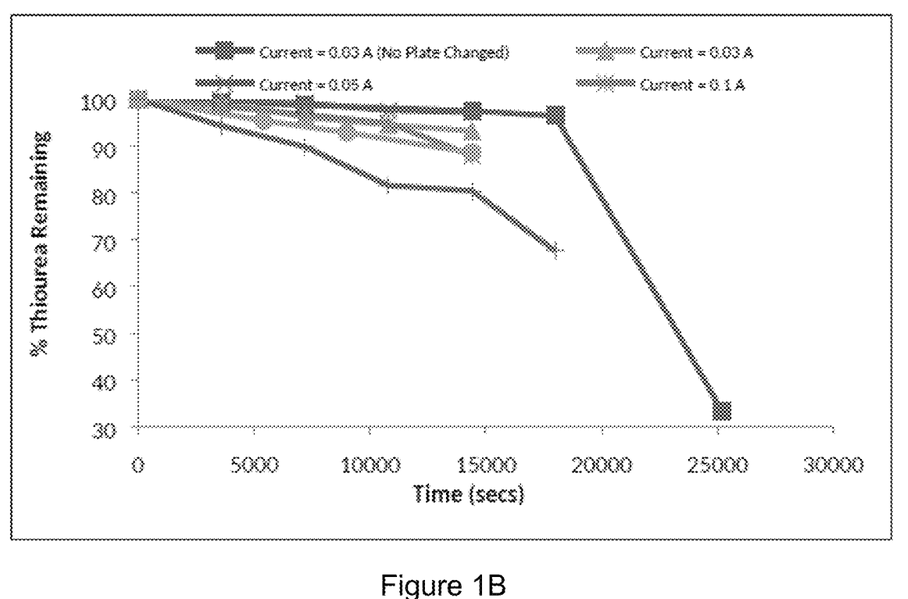
FIG. 1B is a graph showing the percentage of thiourea (TU) remaining in the solution with electrolysis time at varying currents.

Results and Discussion:

Role of Current Density and Stirring Speed During Electrodeposition of Ag from the Spent Regenerant ($Ag(TU)_x^+$) Solution:

FIGS. 1A and 1B show the percentage Ag recovery profile and the corresponding percentage TU remaining in the solution, respectively, with electrolysis time at different current values. (Conditions: stirring speed 300 r/min, initial Ag concentration ($C_{Ag\_initial}$) ~530-575 mg/L, initial TU concentration ($[TU]_{initial}$) ~0.5 mol/L and initial pH ($pH_{initial}$) ~1.1-1.2.) At 0.03 A (without the plate being changed), Ag recovery could not proceed beyond ~70% in 4-7 hours, whereas the corresponding TU remaining in the solution continued dropping from ~97% to 33%. The resistance of the brown electrodeposited layer of Ag at the cathode possibly diminished the Ag reduction rate. Therefore, subsequently the cathode plates were changed each hour. This improved the reduction rate to ~75% Ag recovery at 0.03 A in 4 hours. The corresponding TU remaining in the solution was ~93%. The improvement in the reduction rate suggested the possibility of the reduction reaction being constrained by the kinetics of electron transfer from the cathode plate to $Ag(TU)_x^+$ ions in the compact layer near the vicinity of the cathode. Therefore, higher currents were tried to improve the reduction rate.

At 0.05 A, Ag recovery of ~91% was achieved with ~97% of TU remaining in the solution in 4 hours. The higher current value of 0.1 A did not result in the improvement of Ag recovery (~91%), but led to an increased TU loss (~88% TU remained in the solution) as compared to the run at 0.05 A in 4 hours. This indicated that the electron-transfer kinetic constraint at the cathode reached its minimum effect at 0.05 A, and higher current values did not improve the reduction rate appreciably (86% and 93% Ag recovery at 0.2 and 0.3 A, respectively). However, at the anode, higher current values caused higher TU depletion from the solution (12, 11 and 20% at 0.1, 0.2 and 0.3 A, respectively) for achieving similar Ag recovery as 0.05 A (~91% Ag recovery with ~3% TU loss).

In the test run with 0.2 A current value, the cathode plates were changed every 90 minutes. This resulted in a poorer Ag-recovery efficiency (~86%) than at lower current values of 0.05 A (~91%) and 0.1 A (~91%), where the cathode plates were changed each hour. This shows that the thickness of electrodeposited layer controlled the electron transfer rate at the cathode and thus, the electrodeposition rate. However, the plate change earlier than an hour was not considered as it achieved the goal of recovering more than 90% Ag with acceptable TU loss (~2-3%) at 0.05 A. Therefore, 0.05 A current with the cathode plate changed every hour was selected for the recovery of Ag from the spent regenerant solution.

In the above runs, the solution was continuously stirred at 300 r/min. Since the rate of an electrochemical reaction is also controlled by the rate of mass transport of the reducing and oxidizing species to the electrodes from the bulk solution, the impact of stirring speed on Ag recovery efficiency and TU loss at 0.05 A current value was also investigated.

Figure 2A:
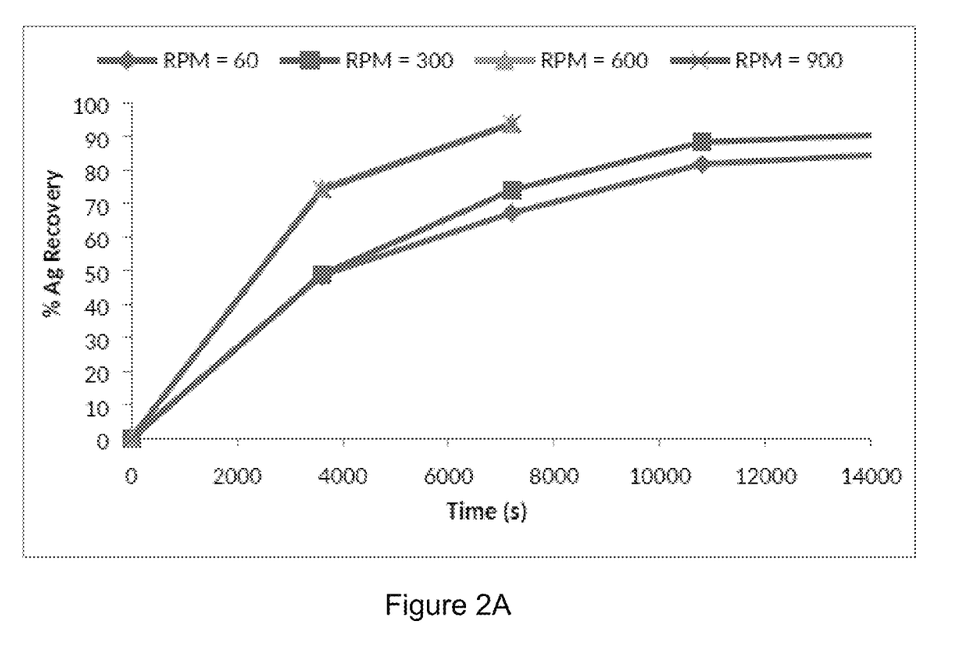
FIG. 2A is a graph showing the percentage of Ag recovery with electrolysis time at varying stirring speeds (RPM).
Figure 2B:
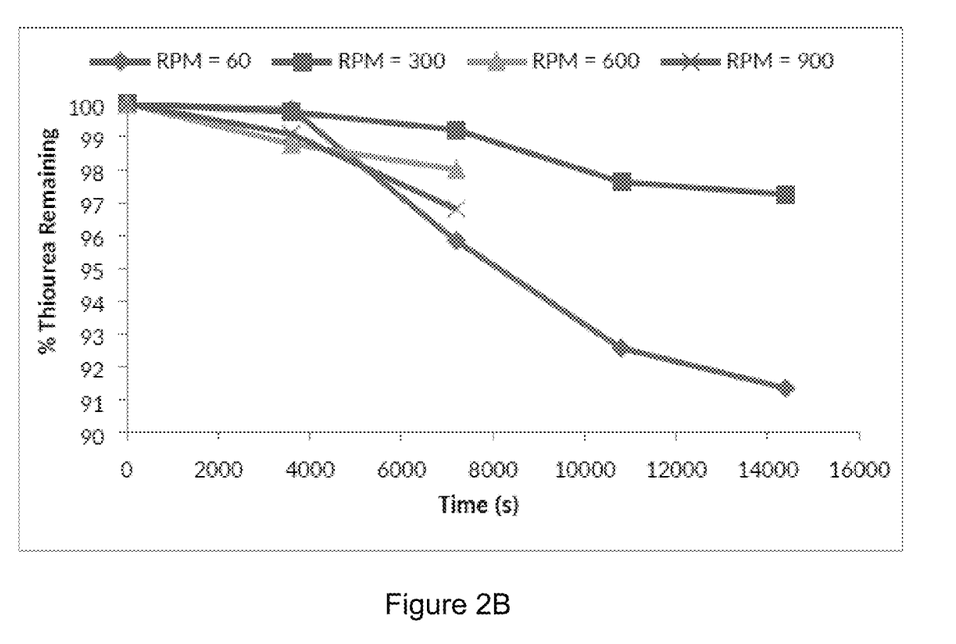
FIG. 2B is a graph showing the percentage of thiourea (TU) remaining in the solution with electrolysis time at varying stirring speeds (RPM).

Reference is made to FIGS. 2A and 2B, where the effect of varying stirring speeds was determined (Conditions: current 0.05 A, $C_{Ag\_initial}$ ~530-575 mg/L, $[TU]_{initial}$ ~0.5 mol/L, $pH_{initial}$ ~1.1-1.2. The cell potential varied between ~1.1-1.3 for all the cases). At 60 r/min, ~85% of Ag was electrodeposited on the cathode plate with ~91% of TU remaining in the solution. The decrease in Ag recovery rate at 60 r/min (~85%) as compared to 300 r/min (~91%) indicates presence of mass transfer constraint to Ag-reduction at the cathode. Therefore, higher stirring speed values were investigated. At 600 r/min, it was observed that ~94% of Ag was electrodeposited on the cathode plate with ~98% of TU remaining in the solution in 2 hours. The current efficiency also considerably improved from~7% at 300 r/min to 13% at 600 r/min with respect to $Ag^+$ reduction at the cathode. Increasing the r/min to 900, however did not lead to any improvement in the percentage Ag recovery (~94%) or lower TU loss (~97% TU remained in the solution) as compared to 600 r/min. This observation shows that beyond 600 r/min mass transport constraints became minimum.

Figure 3A:
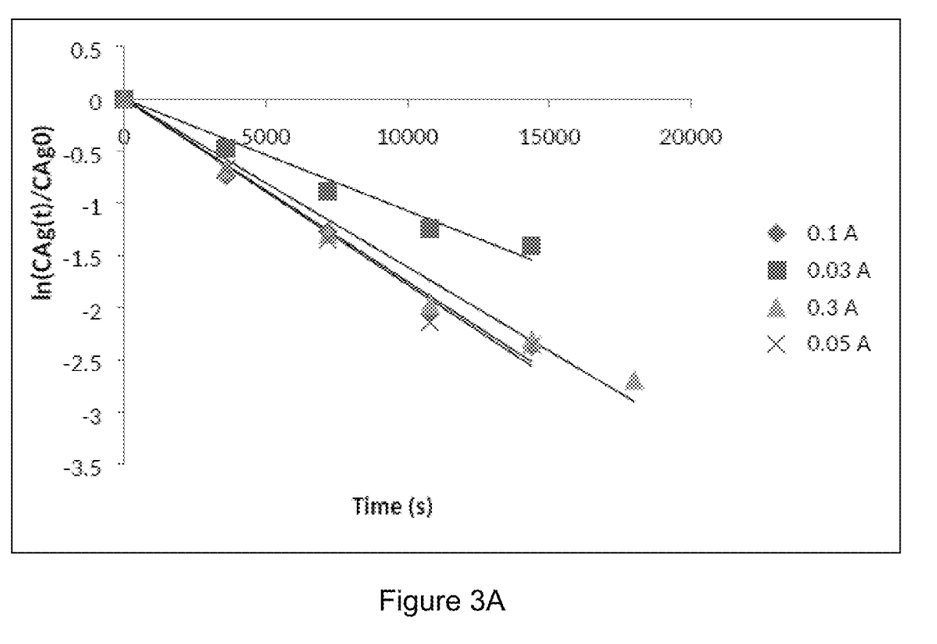
FIG. 3A is a graph showing the variation of the natural logarithm of the normalized Ag-concentration with electrolysis time at different current values and constant stirring speed (300 r/min).
Figure 3B:
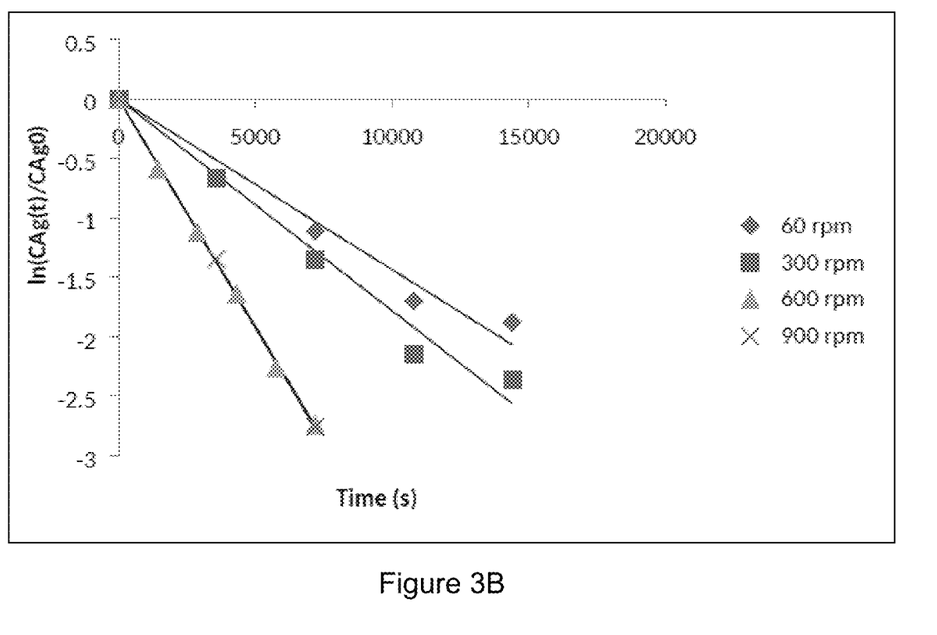
FIG. 3B is a graph showing the variation of the natural logarithm of the normalized Ag-concentration with electrolysis time at different stirring speed and constant current (0.05 A).

The electrodeposition rate can also be understood by the rate-kinetics models. If a first order reaction rate and/or mass transfer limitation govern the electrodeposition rate, then the following model can describe the electrodeposition process:

$$\ln \frac{C_{Ag(t)}}{C_{Ag(o)}} = -Kt_E \tag{8}$$

where, $C_{Ag(t)}$ is the concentration of Ag in the solution at time t; $C_{Ag(O)}$ is the initial concentration of Ag in the solution; K=first order rate constant (controlled by reaction kinetics) or the mass transport coefficient; $t_E$ is the electrolysis time Referring to FIGS. 3A and 3B, plotting the logarithmic of the normalized concentration versus electrolysis time and performing linear fit according to equation (8), straight lines are obtained with varying slopes (K). (Conditions: $C_{Ag\ initial}$ ~530-575 mg/L, $[TU]_{initial}$ ~0.5 mol/L and $pH_{initial}$ ~1.1-1.2. $C_{Ag(t)}$: the concentration of Ag in the solution at time t; $C_{Ag(O)}$: the initial concentration of Ag in the solution.)

$R^2$ close to 1 shows that the first order reaction kinetics accurately describe the electrodeposition process. The measure of slope is indicative of the rate of the electrodeposition process. From FIG. 3A, it can be inferred that at 300 r/min, the rate of deposition is limited by the mass transport processes and not by the electron transfer process at the cathode, as increasing current does not result in the increase of the electrodeposition rate (slope for 0.05 A, 0.1 A and 0.3 A is 0.0002 $s^{-1}$). Therefore, to overcome mass transfer resistance, higher stirring speed is necessary.

In FIG. 3B, higher stirring speed values (600 and 900 r/m in) led to an increase in the value of K (0.0004 $s^{-1}$), and concomitantly, the electrodeposition rate. Since no further improvement in the value of the slope occurs at increasing r/min from 600 to 900 r/min, it can be concluded that further scope of overcoming mass transport constraints is limited.

The variation of slope values across current densities and stirring speed conclusively demonstrate that the electrodeposition process was constrained both by electron transfer and mass transport limitation. Based on the value of K, the stirring speed of 600 r/min, current of 0.05 A, and the electrolysis time of 2 hours were considered optimum for the process design of the system leading to ~94% Ag recovery with ~98% TU remaining in the solution which can be recycled and reused for multiple cycles as a regenerant solution.

Reaction Mechanism of Ag Electrodeposition from the Spent Regenerant ($Ag(TU)_x^+$) Solution At the cathode, for TU and Ag concentrations used in the present work, the electrodeposition of Ag proceeds via reduction of $Ag(TU)_x^+$ and free $Ag^+$ ion species as shown in equation (9) and (10):

$$Ag(TU)_x^+ + e^- \rightarrow Ag^0 + xTU \ (x=1-4) \tag{9}$$

$$Ag^+ + e^- \rightarrow Ag^0 \tag{10}$$

Figure 4:
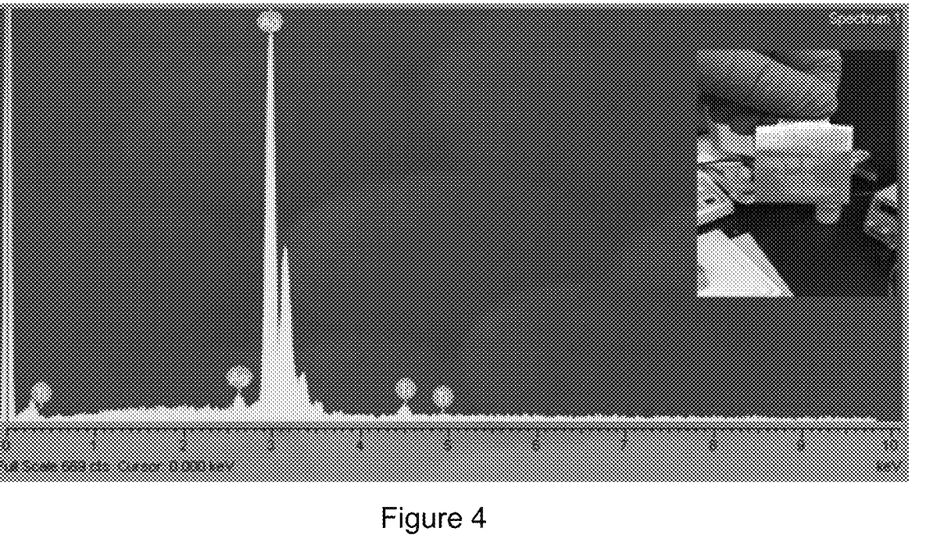
FIG. 4 is an EDX spectra of the brown electrodeposit (shown in inset) collected on the Titanium cathode by electrolysis of the spent regenerant solution.

The EDX analysis on the brown deposit is shown in FIG. 4 (Electrolysis conditions: electrolysis time 2 h, $C_{Ag\ initial}$ ~540 mg/L, final Ag concentration ($C_{ag\ final}$) ~34 mg/L, $[TU]_{initial}$ 0.483 mol/L, final TU concentration ($[TU]_{final}$) 0.475 mol/L $pH_{initial}$ and final pH ($pH_{final}$) 1.3.). The EDX spectra showed prominent Ag and titanium peaks. The titanium peaks are due to the background electrode plate material. Therefore, the Ag signal comes entirely from the brown electrodeposits. Absence of any other elemental peaks in the spectra confirms that the brown electrodeposit is 100% pure $Ag^0$.

Figure 5:
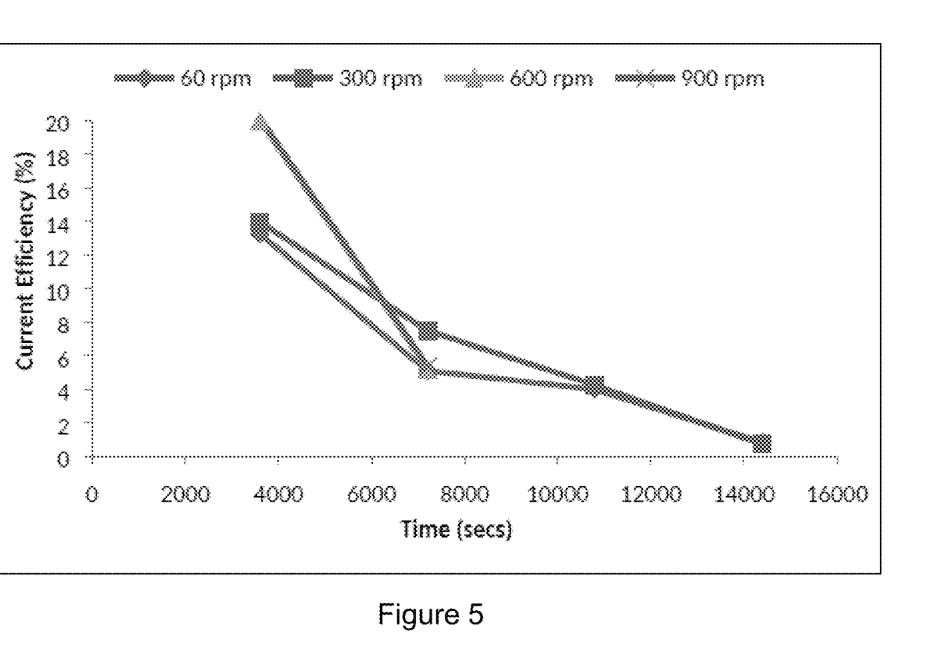
FIG. 5 is a graph showing the current efficiency in each time interval of the electrolysis time for Ag-electrodeposition at different r/min and constant current of 0.05 A.

No TU was observed to be adsorbed on the Ag-electrodeposit. The other reactions taking place at the cathode could be proton and oxygen reduction. The maximum current efficiency achieved was 21% for Ag-electrodeposition. The fact that current efficiency decreased (FIG. 5) with the progress of electrolysis denotes the presence of parasitic reactions. Increasing the stirring speed or current value can improve current efficiency of Ag-electrode position. However, increasing TU loss with the operating parameters constrained the potential improvement in current efficiency values. It has been reported that hydrogen evolution via proton reduction during Ag—Au alloy electrodeposition from the TU solution at pH ~2 leads to lower current efficiency with the progress of the electrolysis.

During the electrolysis experiments, the solution pH increased from ~1.1 to ~1.3. Also, at the cathode bubbles were seen. The pH-increase and the bubbles at the cathode possibly denote the occurrence of the following reaction:

$$2H^+ + 2e^- \rightarrow H_2 \text{ (gas)} \tag{11}$$

The reduction of dissolved oxygen working on Ag-electrodeposition from acidified TU solution has been previously shown. Therefore, oxygen reduction at the cathode is a possibility in the present work (Equation (12)).

$$O_2 + 4H^- + 4e^- \rightarrow 2H_2O \tag{12}$$

At the anode, the oxidation reaction proceeds via oxidation of TU to formamidinedisulphide (FDS). White crystals were observed at the anode plate at lower r/min (60 r/m in). The EDX spectra of the white precipitate carbon, nitrogen, oxygen and sulfur peaks, probably belonging to the nitrate salt of FDS. Further analysis on the precipitate was not carried out, as its formation via TU oxidation is well reported. Greenish-yellowish particles were also observed on the filter paper after the electrolysis was over and the solution was filtered. The EDX spectra on the particles showed only sulfur peaks. The final solution after electrolysis also showed sulfate concentration in the range of ~1.4-2.9 mg/L for 0.05 A at different stirring speeds. The presence of sulfate showed that further oxidation of sulfur took place at the anode, but the observed low sulfate concentration suggests that this step was not substantial. The appearance of FDS, sulfur and sulfate during the electrolysis explains the typical electrochemical oxidation of TU. Therefore, at the anode following reactions can be proposed to taking place:

$$2TU \rightarrow TU_2^{2+} + 2e^- \quad (13)$$

$$TU_2^{2+} \rightarrow S^0 + CN.NH_2 + TU + 2H^+ + 2e^- \quad (14)$$

$$S^0 + 4H_2O \rightarrow HSO_4^- + 7H^- + 6e^- \quad (15)$$

$$HSO_4^- \rightarrow H^+ + SO_4^{2-} \quad (16)$$

Morphology of $Ag^0$-Electrodeposit: Role of Ag Concentration and Stirring Speed:

FIG. 6(a)-(f) show the SEM images of the Ag-electrodeposit on the cathode plate for 60 r/min stirring speed at 0.05 A. FIGS. 6 (a) and (b) pertain to the first hour of Ag electrodeposition, when Ag concentration varied from ~549 mg/L to ~283 mg/L. The typical morphology of the electrodeposit was cylindrical crystals of 1 to 1.5 μm length, with 350-400 nm diameter at the bottom and 150-250 nm diameter at the top (FIG. 6(b)). In certain spots, where relative density of the electrodeposits was low, pits were seen, possibly formed by the bubbles. Within these pits, the dendritic crystals agglomerated and formed flower-like particles (FIG. 6(a)), whose diameter ranged from 2 to 4 μm. At the second hour of electrodeposition (FIGS. 6(c) and 6(d)), when Ag concentration was between ~283 mg/L and ~180 mg/L, the crystal population density was relatively low, and the crystals formed flower-like agglomerates, though smaller in diameter (<2 μm) than those in the first hour. At some spots, the cylindrical crystals were not pointed but appeared smoothly rounded and smaller in size (200-400 nm) (FIG. 6(c)). At the third and fourth hours of electrodeposition (Ag concentration ~180 mg/L and ~100 mg/L, respectively), the crystals became further smaller in size (400-600 nm), becoming spherical beads of diameter ranging from ~100 to 400 nm in the fourth hour.

Figure 6:
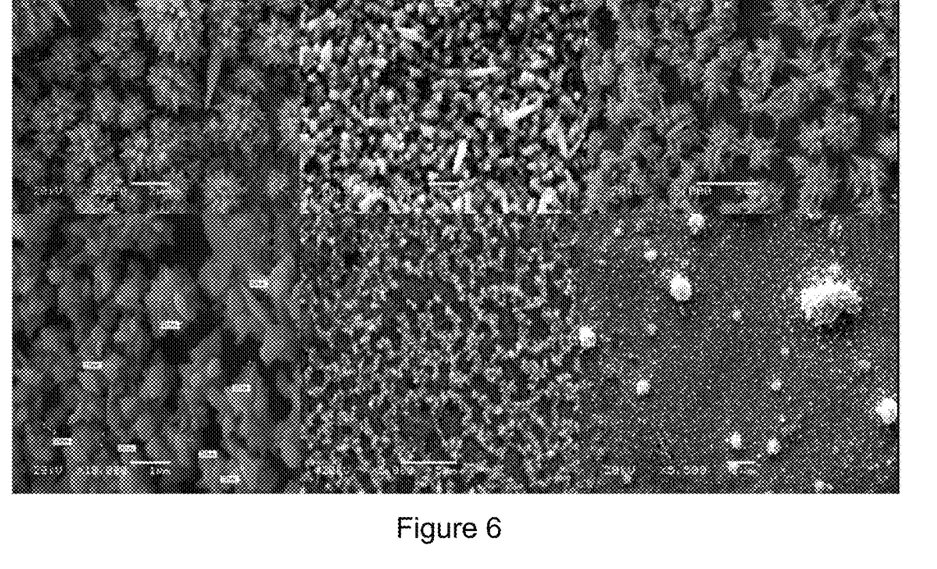
FIG. 6 includes SEM images 6(a) to 6(f) of the Ag-electrodeposit on the titanium cathode obtained in each hour of the electrolysis time (4 hours) at 0.05 A and 60 r/min.
Figure 7:
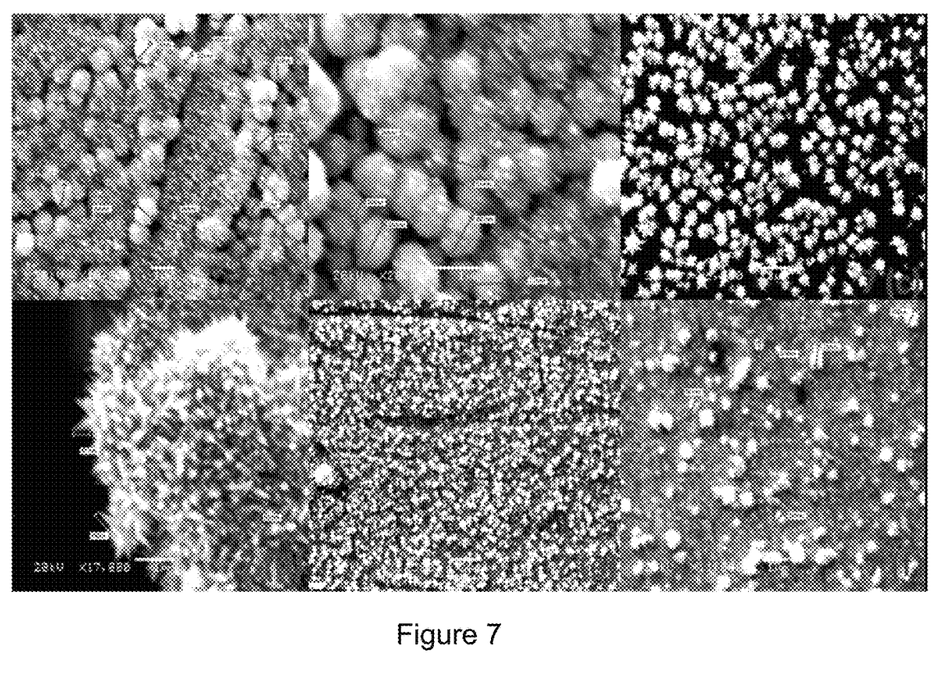
FIG. 7 includes SEM images 7(a) to 7(f) of the Ag-electrodeposit on the titanium cathode obtained in each hour of the electrolysis time (4 hours) at 0.05 A and 300 r/min.
Figure 8:
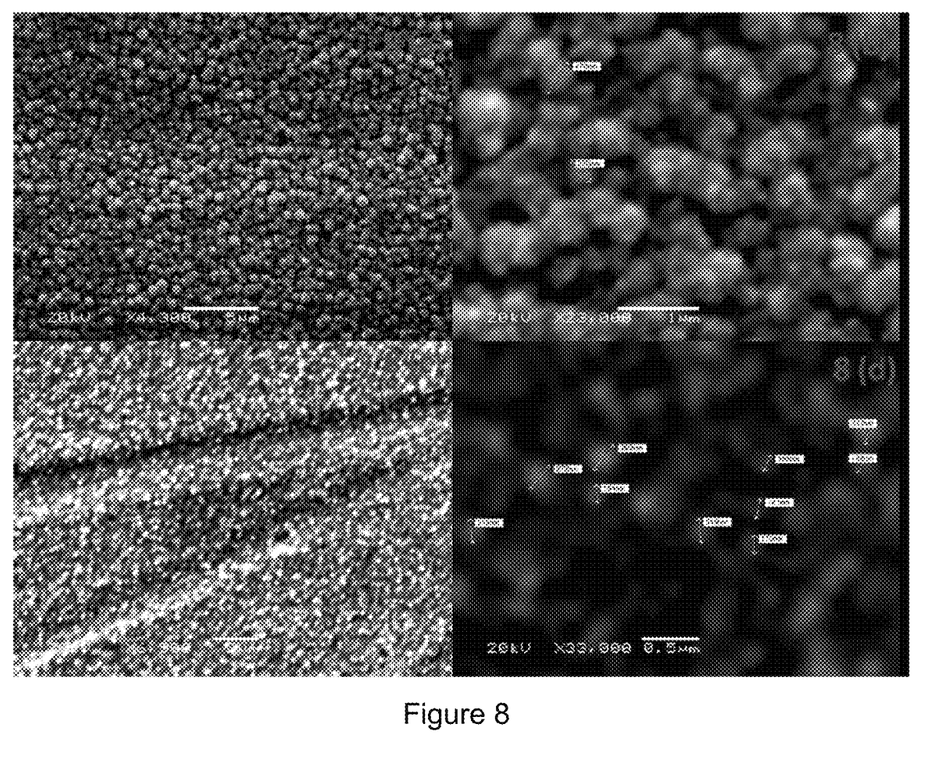
FIG. 8 includes SEM images 8(a) to 8(d) of the Ag-electrodeposit on the titanium cathode obtained in each hour of the electrolysis time (2 hours) at 0.05 A and 600 r/min.

The SEM images show that the reduction in Ag concentration each hour affects the electrodeposit morphology. Further changes in the electrodeposit morphology was observed each hour (FIG. 7(a)-(f)) when the stirring speed is increased to 300 r/min. In the first hour (FIGS. 7(a) and (b)) (Ag concentration varying between ~575 mg/L and ~295 mg/L), the typical morphology consists of spherical beads, diameter ranging from 350 nm to 1.5 μm, and closely-packed particles in the size range of 150-200 nm diameter. No cylindrical crystals were seen. The shear effect of the higher stirring speed inhibited crystal growth in the direction perpendicular to the cathode, thus resulting in rounded, spherical beads. However, in the second hour, when Ag concentration varied between ~295 mg/L to ~150 mg/L, the cylindrical crystals were seen in the size range of 300-600 nm. Therefore, the cylindrical crystal growth depends not only on the stirring speed, as higher turbulence would limit its growth, but also on the concentration range of electrodeposition. In the case of low electrodeposition thickness (caused by low Ag-concentration range), the growing crystallites would experience the effect of shear force (caused by stirring) less strongly than in cases where electrodeposit thickness is higher. Since for thicker electrodeposit, the compact layer would be in closer proximity to the bulk solution. In the third hour, Ag concentration varied between ~150 mg/L to ~67 mg/L, the spherical shaped particles were prominently seen in the size range of 200-300 nm; the maximum sized particles observed were of ~500-600 nm, though quite sporadically. In the fourth hour, spherical particles in the size range of ~170-350 nm were prominently seen.

In the case of 600 r/min at 0.05 A (FIG. 8(a)-(d)), a uniform electrodeposition was observed, with particles uniformly in spherical shape and no cylindrical crystals were seen. The maximum size of the spherical beads was less than 700 nm, with average size as ~321 nm, as calculated from a size-distribution histogram. In the second hour (FIGS. 8(c) and 8(d)), the average particle size was calculated as ~123 nm. High stirring speed (600 r/m in) and high concentration range deposition at once (Ag concentration varying between ~540 mg/L and ~138 mg/L in one hour) prevented cylindrical crystal growth.

Figure 9:
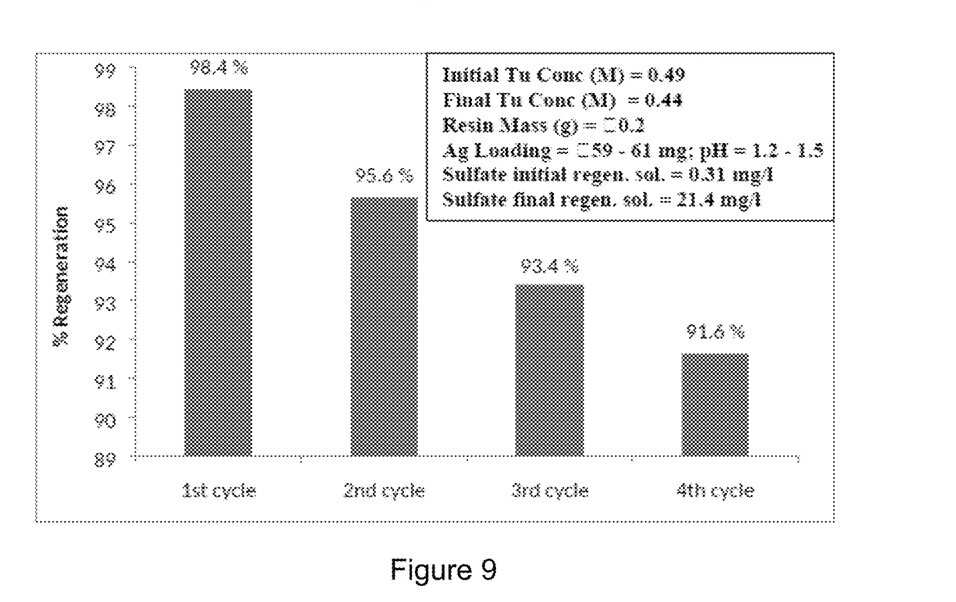
FIG. 9 is a bar graph showing the regeneration efficiency of the reclaimed regenerant solution 4 cycles of consecutive regeneration and Ag-extraction.

Recycle and Reuse of the Spent Regenerant Solution:

The regenerant solution after Ag extraction was recycled and reused for its effectiveness in regenerating the fully loaded resin samples. An electrolytic extraction step preceded each reuse cycle. In the first cycle, freshly prepared regenerant solution regenerated the resin sample with ~98% efficiency. In the subsequent cycles, i.e. first, second and third reuse, the regeneration efficiency was noted to be ~96%, ~93% and ~92% respectively (FIG. 9). The decrease in the regeneration efficiency is attributed to loss of TU concentration in each Ag-extraction step (roughly ~2% each cycle), and the presence of unrecovered Ag in the regenerant solution (58.36 mg/L, 56.67 mg/L and 57.4 mg/L Ag remained in the regenerant solution before first, second and third reuse cycle, respectively), as Ag remaining in the solution prior to the regeneration step would use up some TU for complexation, and may impact the Ag-concentration driving force for the regenerant.

After four cycles, ~91% of TU remained in the solution. Sulfate concentration increased over the four cycles to 21.4 mg/L. This confirms that TU oxidation during the electrolytic extraction of Ag proceeded as shown in Equations 13-16 above.

The recycle and reuse results demonstrate that the spent regenerant solution can be effectively used for the resin regeneration in multiple cycles until TU can be successively destroyed before its disposal. Also, the present work is an improvement from previous methods where the spent regenerant solution, after Ag recovery and prior to its subsequent reuse, was subjected to pH adjustment from alkaline to acidic range. In the present work, pH adjustment is not required as negligible variation is observed over the four cycles of extraction and regeneration reuse (pH varies from 1.2-1.5). This simplifies the handling of the spent regenerant solution and makes its reuse and disposal convenient. The recycle and reuse performance provide robustness and sustainability to the process scheme. It demonstrates that in practical applications, the process would not lead to waste generation and all its raw materials can be reused multiple times in a closed loop scheme, resulting in significantly lower requirement of raw materials in the first place. Moreover, successive destruction of TU (roughly ~2% each cycle) also show that the process intrinsically transforms a hazardous waste (TU) into a disposable/recoverable form, such as sulfur and sulfate.

Figures 10A, 10D:
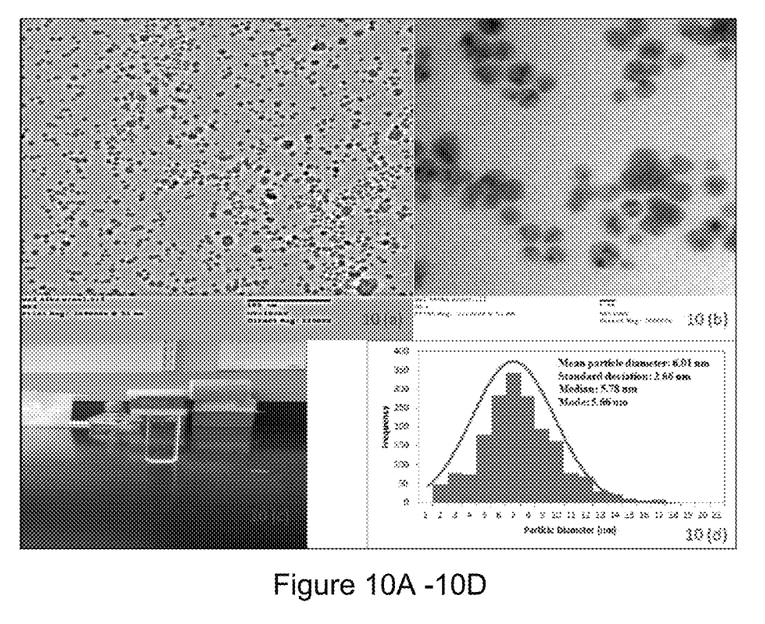

Final Ag Recovery from the Electrodeposited Cathode Plate as Ag-Nanoparticles:

FIGS. 10A and 10B show the typical TEM images of $Ag^0$ nanoparticles recovered in the present work. The particles are uniformly spherical in shape. The average particle diameter obtained by analyzing 1869 particles is ~6 nm with standard deviation of the Gaussian fit is 2.66 nm (FIG. 10D). The yellow solution (FIG. 10C), and the plasmon absorption peak at wavelength ($\lambda$)=405 nm is consistent with the spherical shaped, monodisperse $Ag^0$ nanoparticles previously reported.

The plasmon absorption profile shows that the $Ag^0$ nanoparticle formation commenced after 5 minutes (FIG. 11), when the solution became noticeably light yellow in color, which with time turned dark yellow to brown at the end of 60 minutes. The increase of absorption peak intensity is consistent with the deepening of the yellow-brown color, implying increasing concentration of $Ag^0$ nanoparticles. The symmetrical and broad absorption band of the spherical particles also correlates well with the existing theory that the broader absorption band is typical of smaller sized particles, and narrow particle size distribution. This is also in good agreement with the TEM images of the particles (FIGS. 10A and 10B for 5 g/L citric acid).

The evolution of symmetrical absorption bands over time also indicates that particles consistently maintained a uniform size distribution and monodispersity, despite increasing formation of $Ag^0$ nanoparticles. This is favorable for process scale-up, where higher Ag—loaded electrode plates would be used to recover monodisperse $Ag^0$ nanoparticles.

Trial runs were also conducted without citric acid, and yellow color solution was not observed. The absorption spectra did not show any peak in the wavelength range of 300 to 500 nm. Black deposition occurred over the graphite cathode. The black deposits were also seen over the graphite cathode even in the presence of citric acid. Electroreduction of $Ag^+$ involves two competing cathode surface phenomena: (1) $Ag^0$ nanoparticles formation, and (2) electrodeposition of Ag on the cathode. Additionally, once the cathode is covered with Ag-electrodeposits, $Ag^0$ nanoparticles will not be formed. Therefore, minimizing the electrodeposition is a key challenge in the electrochemical production of $Ag^0$ nanoparticles. A viable solution to this problem involves using a stabilizing agent, which prevents floe formation by stabilizing the $Ag^0$ nanoparticles around the cathode. Particularly, molecules with polyfunctional groups are more suitable as they lead to chelation, and thus to greater stability as metal atoms are tightly held and sterically hindered from interacting with other atoms, which effectively arrests the particle growth.

Citric acid was chosen as it has high chelating ability for $Ag^+$ ions, due to the presence of three carboxylate groups in its chain. Also, it is inexpensive, natural, non-toxic and biodegradable. The operating pH ~6 was selected on the basis that citric acid remains predominantly deprotonated ($pKa_1$: 3.13; $pKa_2$: 4.76 and $pKa_3$: 6.4) to co-ordinate with $Ag^+$. Lower pH (~2.8) was also studied, $Ag^0$ nanoparticles formation was seen to be much slower than the electrodeposition at the cathode, and no nanoparticle formed. A light gray solution was finally observed.

Sodium dodecyl benzene sulfonate (SDBS) as a stabilizing agent was also studied. But $Ag^0$ nanoparticle formation was not observed. This highlights the importance of chelation; stabilizing agent with only one functional head in its chain, such as SDBS, is ineffective in strongly holding to the metal ions against depositing on the cathode. However, it was found that SDBS in conjunction with citric acid can improve the size distribution and monodispersity, due to the hydrophobic effect of SDBS long carbon chain. The graphite cathode was selected because it is a non-metal, and metal deposit would not be strongly held on its surface, due to weak metal-non-metal interaction. In the present work black Ag-electrodeposit was recovered from the graphite cathode by merely rinsing it with DI water. This is important from a recovery perspective, so as not to lose any recovered Ag mass. The black powder, thus formed, can also be re-dissolved to form $Ag^0$ nanoparticles.

Figure 11:
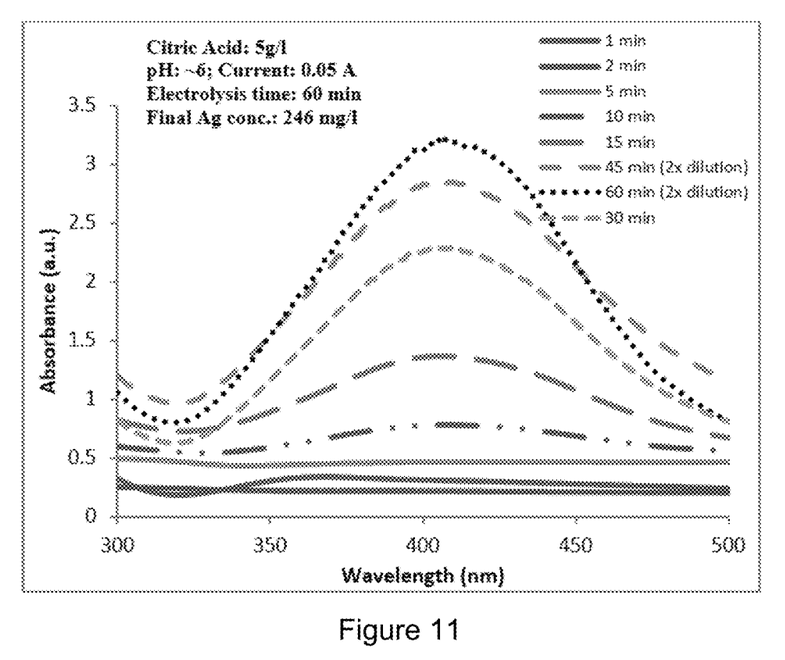
FIG. 11 is a graph showing the evolution of plasmon absorption spectra obtained during $Ag^0$ nanoparticle synthesis with electrolysis time at 0.05 A.

In FIG. 11, the valley at ~315-320 nm is typical of $Ag_2^+$ species, formed by aggregation of $Ag^0$ species with $Ag^+$ ions during Ag-reduction, which in the presence of citrate ions are further stabilized as $[Ag_2^+citrate^-]$ clusters. These clusters are further reduced and form citrate capped nanoparticles. The citrate ions arrest the growth of $Ag^0$ nanoparticles at ~3 nm and prevent further growth of particles in the case of photolytic reduction.

In the present case, the valley at ~315-320 nm is typically seen for plasmon band at all time and concentrations. Therefore, it is inferred that the $Ag^0$ nanoparticles formation proceeded via $[Ag_2^+citrate^-]$ clustering, and subsequent reduction at the graphite cathode. The yellow color solution was first observed near the cathode, which due to stirring and diffusion spread uniformly in the solution. This implies that the reduction process occurred at the cathode via electron transfer by electrolysis, and the citrate ions mainly functioned as stabilizing agents, unlike chemical reduction where citrate ions act both as a reducing and a stabilizing agent.

In chemical reduction using citrate ions as the reducing agent, irregularly shaped, large $Ag^0$ nanoparticles in the size range of ~50 to 100 nm are formed via Ostwald ripening mechanism. Moreover, citrate reduction is slower and takes place at higher temperature, which is achieved by boiling the solution. In the present case, $Ag^0$ nanoparticles are uniformly spherical, with ~6 nm diameter particles and narrow size distribution (FIG. 10D). This agrees well with photolysis and pulse radiolytic results, where citrate ions are mainly functional as stabilizing agents and aqueous electrons are responsible for $Ag^+$ reduction.

Figure 12:
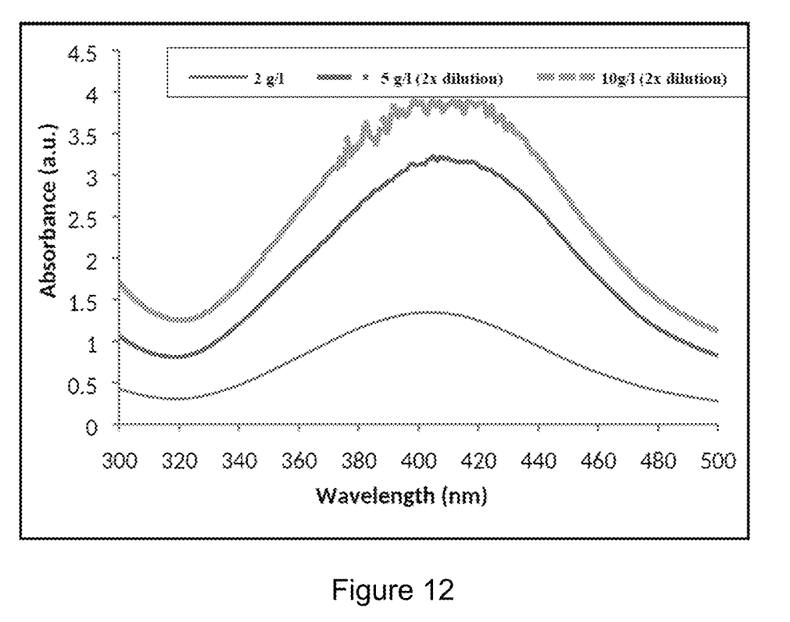
FIG. 12 is a graph showing the influence of citric acid concentration on the UV-Vis absorption spectra of $Ag^0$ nanoparticles.

On varying the concentration of citric acid, variation in the plasmon absorption characteristics was observed (FIG. 12). At 10 g/L, 5 g/L, and 2 g/L citric acid concentrations, the peak absorption intensity wavelength ($\lambda_{max}$) occurred at 417 nm, 405 nm and 403 nm, respectively. The red shift in $\lambda_{max}$ is typically associated with increasing particle size. This shows that at 10 g/L citric acid, $Ag^0$ nanoparticles were larger in size as compared to 2 g/L and 5 g/L citric acid. The increasing plasmon peak intensity with increasing citric acid concentration implies more reduction occurred at higher concentration of citric acid, resulting in higher concentration of $Ag^0$ nanoparticles at the end of 60 minutes. AAS analysis also shows that the $Ag^0$ nanoparticles concentration increased with increasing citric acid concentration.

In the case of 10 g/L citric acid, the red shift can be attributed to the reducing role of citric acid or to the higher $Ag^0$ nanoparticles concentration which results in higher agglomeration. The $\lambda_{max}$ around 420 nm has been reported for citric acid acting as the reductant. The increase in plasmon absorption intensity also suggests that citric acid at 10 g/L acted both as reducing as well as stabilizing agent. The reducing action of citric acid in conjunction with the electro reduction of the electrolytic process potentially resulted in faster $Ag^+$ reduction and thus to higher concentration in the same period of 60 minutes, as compared to 2 g/L and 5 g/L. The $\lambda_{max}$ at 403 nm and 405 nm, is indicative of citric acid acting only as a stabilizing agent.

The nanoparticles synthesized in the present work are of pure $Ag^0$, since no other reducing, or precipitation process is possible for nanoparticle formation relevant to the solution condition (the solution contains citrate and hydroxide ions at pH ~6). The only other nanoparticles that can potentially form in the presence of hydroxide ions are of $Ag_2O$. However, $Ag_2O$ nanoparticles formation is reported for pH>10. In the present system, the solution pH was ~6, which did not change appreciably with the electrolysis (final pH observed was ~6.5). Therefore, $Ag_2O$ nanoparticles are ruled out. This essentially means that the nanoparticles prepared in the study are of $Ag^0$.

The AAS analysis showed the percentage recovery as Ag nanoparticles were 54% recovery with ~184 mg/L Ag for 2 g/L citric acid solution, ~71% recovery with ~246 mg/L Ag for 5 g/L citric acid solution, and 75% recovery with ~254 mg/L Ag for 10 mg/L citric acid solution, respectively. In the study, black electrodeposit around the graphite cathode and in the bottom of the cell was also observed. EDX analysis on the powder showed them to be $Ag^0$. The electrodeposits were collected on the filter paper and weighed after drying overnight in the oven at 45±2° C. By accounting the mass of the black powder, the overall recovery of the process was >90%.

In the present work, a simple process scheme is developed for Ag-recovery as $Ag^0$ nanoparticles from the spent regenerant solution (containing acidified TU and $Ag(TU)_x^+$) using an undivided electrolytic cell in a galvanostatic manner. The two-step process recovers ~94% Ag as electrodeposit on the titanium cathode and reclaims the regenerant solution with ~2% loss of TU. The process conditions are fully optimized with respect to the stirring speed (600 r/min) and current (0.05 A) values. The kinetics of electrodeposition follows the first order rate model. In the second step $Ag^0$ nanoparticles are obtained from the Ag-electrodeposit on the titanium electrode plate using the same electrolytic cell with the graphite cathode and citric acid as stabilizing agent. The recovered $Ag^0$ nanoparticles are spherical in shape and monodisperse with ~6 nm as mean diameter and 2.66 nm as standard deviation of the Gaussian fit. The role of citric acid is that of a stabilizing agent. The regenerant solution has been recycled and reused over four cycles with >90% regeneration efficiency in each cycle. The overall recovery scheme is sustainable, and its application in areas, such as leaching of Ag-bearing mineral ores, printed circuit board from mobile phones, stripping of Ag-loaded ion-exchangers/adsorbents, where TU is used to recover/concentrate would lead to efficient waste management, resource recovery and recycle and reuse of hazardous waste.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of recovering silver from silver-containing waste water solution, comprising:
    (a) providing an ion exchange column comprising an ion exchange resin;
    (b) introducing the silver-containing waste water solution to the ion exchange column to absorb silver in the ion exchange resin;
    (c) eluting the loaded ion exchange resin with an acidified thiourea regenerant solution to remove silver from the resin and to obtain a spent regenerant solution containing a thiourea-silver complex, $Ag(TU)_x^+$, where x=1-4;
    (d) electrolytically separating the silver from the $Ag(TU)_x^+$ complex of the spent regenerant solution by electrodepositing silver onto a substrate, and removing the silver depleted thiourea regenerant solution;
    (e) electrolytically recovering the silver as $Ag^0$ nanoparticles from the silver-deposited substrate by submerging the silver-deposited substrate and a graphite electrode in an electrolyte solution comprising a stabilizing agent comprising citric acid in an electrolytic cell, and applying current to the electrolytic cell; and
    (f) reusing the silver depleted thiourea regenerant solution removed in step (d) in subsequent elution of loaded ion exchange resin.

2. The method of claim 1, wherein the ion exchange resin comprises a thiol functionalized ion exchange resin.

3. The method of claim 1, wherein the ion exchange resin comprises a macroporous polystyrenic acidic cation exchange resin containing thiol functional groups.

4. The method of claim 1, wherein the recovered $Ag^0$ nanoparticles have about 100% purity.

5. The method of claim 1, wherein the amount of recovered silver is at least 90% by weight of the silver in the silver-containing waste water.

6. The method of claim 1, wherein the amount of recovered silver is at least 94% by weight of the silver in the silver-containing waste water.

7. The method of claim 1, wherein the recovered $Ag^0$ nanoparticles are substantially spherical in shape and have an average diameter of 3.4 nm to 8.7 nm.

8. The method of claim 1, wherein the pH of the acidified thiourea regenerant solution is in the range of 1.0 to 1.3.

9. The method of claim 1, wherein the electrolytic separation step (d) does not include the addition of external chemicals to the electrolyte solution.

10. The method of claim 1, wherein the stabilizing agent further comprises sodium docedyl benzene sulfonate.

11. The method of claim 1, wherein the pH of the electrolyte solution in step (e) is about 6.

12. The method of claim 1, wherein the thiourea content of the silver-depleted thiourea regenerant solution of step (f) is at least 95% of the thiourea content of the regenerant solution of step (c).

13. The method of claim 1, wherein the substrate comprises a titanium plate.

14. A method of recovering silver from greywater, the method comprising:
    (a) providing an ion exchange column comprising an ion exchange resin;

(b) introducing the silver-containing greywater to the ion exchange column to absorb silver in the ion exchange resin, wherein the greywater contains at least one detergent composition;

(c) eluting the loaded ion exchange resin with an acidified thiourea regenerant solution to remove silver from the resin and to obtain a spent regenerant solution containing a thiourea-silver complex, $Ag(TU)_x^+$, where $x=1$-4;

(d) precipitating silver from the thiourea composition by adjusting the pH of the spent regenerant solution to recover the silver, wherein the silver is recovered as $Ag_2S$ nanoparticles and/or high purity powder; and (e) obtaining silver depleted thiourea regenerant solution.

15. The method of claim 14, wherein the ion exchange resin comprises a thiol functionalized ion exchange resin.

16. The method of claim 14, wherein the at least one detergent comprises one or more component selected from sodium dodecylbenzene sulfonate (SDBS), sodium dodecyl sulfate (SDS), alcohol ethocylate non-ionic surfactant, diethylenetriamine pentaacetate (DTPA), zeolite, sodium metasilicate pentahydrate, sodium carbonate, 4,4'-diamino-2,2'-stilbenedisulfonic acid, sodium perborate, tetraacetylethylenediamine (TAED), and combinations of two or more thereof.

17. The method of claim 14, wherein adjusting the pH of the spent regenerant solution comprises increasing the pH to about 11-12 by adding NaOH solution.

18. The method of claim 14, further comprising readjusting the pH of the silver depleted regenerant solution to about 1.5, and reusing the silver depleted regenerant solution in subsequent elution of loaded ion exchange resin.

* * * * *